United States Patent [19]

Tauber et al.

[11] 4,286,464

[45] Sep. 1, 1981

[54] OPTICAL FLUID LEVEL MONITOR

[75] Inventors: Thomas E. Tauber, Upper Darby, Pa.; James Magee, Palmyra, N.J.

[73] Assignee: Technical Development Company, Glenolden, Pa.

[21] Appl. No.: 112,088

[22] Filed: Jan. 14, 1980

[51] Int. Cl.³ .................................... G01F 23/00
[52] U.S. Cl. .................................... 73/293; 340/619
[58] Field of Search ............... 73/293, 292; 116/227; 340/619; 106/54

[56] References Cited

U.S. PATENT DOCUMENTS

| 3,120,125 | 2/1964 | Vasel | 73/293 |
| 3,338,457 | 8/1967 | Tygenhof | 116/227 |
| 3,834,235 | 9/1974 | Bouton | 116/227 |
| 3,957,342 | 5/1976 | Newns | 106/54 |
| 4,084,426 | 4/1978 | Gales | 73/293 |

FOREIGN PATENT DOCUMENTS 2002905 2/1979 United Kingdom ............... 73/293

Primary Examiner—Gerald Goldberg
Assistant Examiner—Denis E. Corr
Attorney, Agent, or Firm—Robert S. Lipton

[57] ABSTRACT

An optical fluid level monitor is disclosed. It comprises a plurality of prismatic sensors disposed in a linear array for measuring the levels of fluids, such as oil, in sumps of aircraft and helicopter engines and other closed containers. In use each of the sensors is sequentially pulsed by an integral light source. If the detector is above the fluid level it appears bright, if below it appears bright, if below it appears dark, this difference being caused by an integral light detector device. Counting circuits are provided to determine the number of bright sensors and electronically convert this into a fluid volume for display purposes. A presettable low volume alarm is also included as is a correction circuit to compensate for volume changes caused by heating of the fluid in use.

7 Claims, 18 Drawing Figures

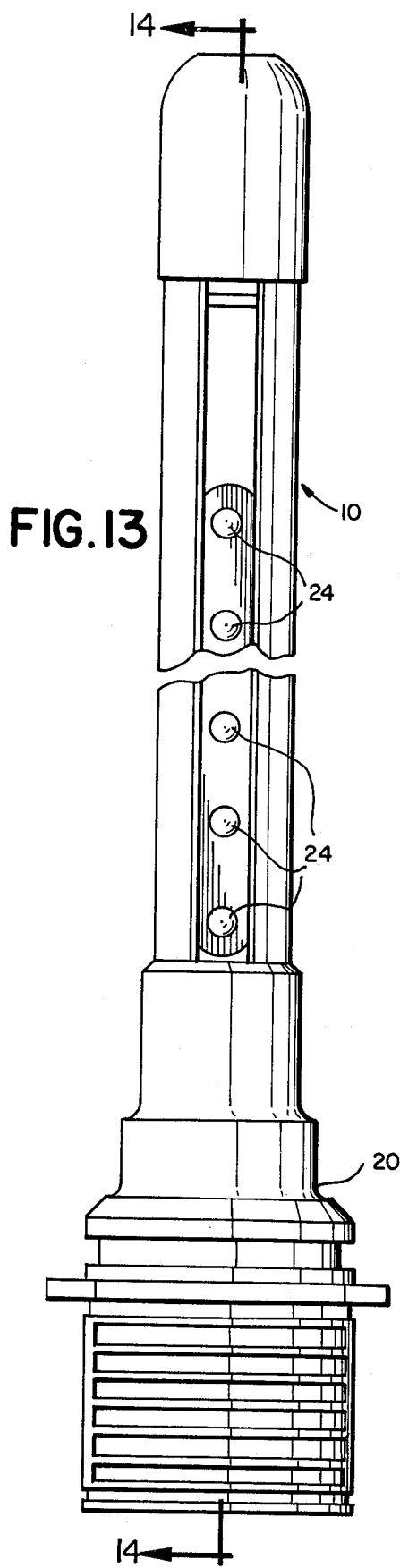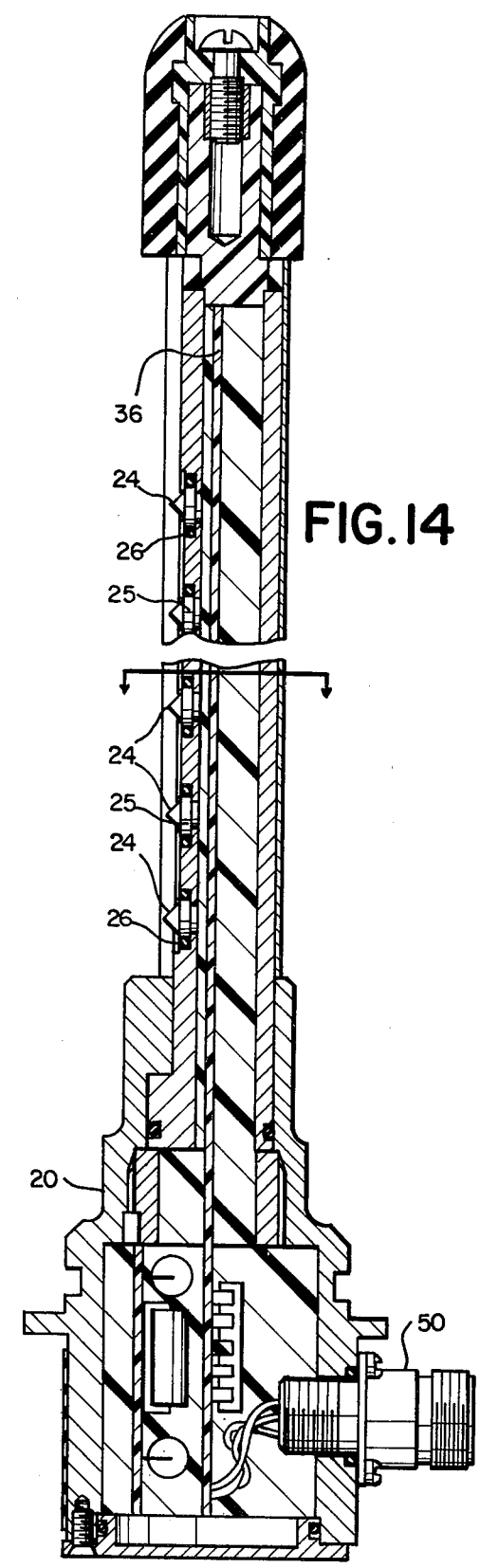

4,286,464

OPTICAL FLUID LEVEL MONITOR

FIELD OF THE INVENTION

This invention relates to optical sensors of the type designed to monitor the levels of fluids, such as oil, in sumps of aircraft and helicopter engines and other closed containers.

BACKGROUND OF THE INVENTION

One problem common to the operation of many types of motor driven equipment is the monitoring of the quantities or levels of lubricating and transmission oils, fuel, cooling water and other fluids associated with the equipment. Where the operation is discontinuous and the sump or other container holding the fluid is reasonably accessable, such as with most automotive equipment, simple dip sticks or dynamic float sensors will suffice to give the operator a reasonably accurate reading as to the quantity of fluid present. In other cases, such as with sealed cooling systems in high performance automobiles or the engine and rotor gear box sumps in helicopters, these devices are not sufficiently reliable to monitor the level when that level is critical to the performance of the equipment.

To meet this need a variety of passive optical sensors have been developed. These are merely cylindrical glass or transparent plastic rods with a 45° prism ground or molded onto the bottom end. The refractive index of the rod material is such that if a beam of light is transmitted down the rod from the flat top end it will be reflected internally from the sides of the prism and come back up the rod. When this happens, the top end appears bright. If, however, the prism is totally immersed in the fluid, the index of refraction is changed so that the light is no longer reflected internally. Rather, all the light is transmitted out of the rod and not reflected back so that the top appears dark.

Lastly, where the fluid only partially covers the prism the top similarly shows a partially illuminated top. These "bulls-eye" detectors are widely used and have reached a fair level of sophistication. For example, one finds them with magnifying lenses built into the top. Others are built in banks of rods with built into the top. Others are built in banks of rods with each element having a different length so that the progress of fluid use can be followed. These devices however all tend to share a common defect; they either must be viewed directly by the user thereof or provide a binary on/off output which can be quite difficult to interpret in emergency situations. What is needed is a "bulls-eye" type optical sensor which is adaptable for remote use in aircraft, helicopters and similar equipment and further adapted to provide easy to interpret analog or digital panel gauge outputs both as to the presence or absence of a particular fluid and where it is present, how much of it is there.

BRIEF DESCRIPTION OF THE INVENTION

The subject invention comprises a linear array of "bulls-eye" prismatic detector which fit onto the side of a helicopter sump. Each element of the array is illuminated with a small light source such as a light emitting diode (LED) and observed with a suitable detector such as a light sensitive transistor. In use the detectors are arranged vertically so that each one will sense a different level of fluid. Such testing is done by illuminating in sequence each of the prismatic detectors starting from the top. Each period of illumination is fairly short so that the output, if any, of the photodetector is basically a short pulse. The number of pulses which are counted in any single scan are combined into an analog composite signal which is a function of the empty height of the container. When needed, this can easily be converted into either the fluid height or volume present. With suitable logic such values can be displayed on the cockpit operating panel with a suitable analog or digital panel gauge. This approach also allows the incorporation of several other features which further enhance the utility of the unit. In the first of these, account is taken of the fact that, in use, the fluid tends to heat up and expand in volume so that the value received tends to be in error to some degree. To compensate for this expansion, the subject invention further includes a temperature sensor to correct for this change. The output of this sensor is fed into a compensation circuit and then summed with the optical detector output. The composite signal is an analog output representing a fluid level which is corrected back to some normal standard temperature such as 70° F. By so doing, both the accuracy of the readings and their true significance are greatly increased.

A second feature of the system is brought into play when the true level of the fluid decreases to below some preselected critical value. When such an event occurs, the unit is set to produce an emergency low level signal which, once activated, stays on until the condition is alleviated. The logic to accomplish this with currently available integrated circuit elements, is both compact and inexpensive.

Thus, the main object of the subject invention is to produce a low cost easily used sensing system to measure the heights of fluids in helicopter engine sumps and similar closed containers.

A second object of the subject invention is to provide a system capable of detecting low fluid levels and provide an appropriate signal when such an event occurs.

Still another object of the subject invention is to provide means for compensating the output for errors due to expansion of the fluid as it heats in service.

A further object of the subject invention is to provide outputs suitable for analog or digital display in the helicopter cockpit.

Still a further object of the subject invention is to provide means for optical type sensors to monitor the height of the fluid in the container being observed.

Other and further objectives and advantages will be set forth in the description which follows, taken together with the accompanying drawings in which like numerals refer to like parts.

BRIEF DESCRIPTION OF THE DRAWINGS

FIG. 13 is a front view of an alternative "dip stick" arrangement of the subject invention.

FIG. 14 is a cut away side view of the alternative arrangement shown in FIG. 13 along line 14—14.

DESCRIPTION OF THE PREFERRED EMBODIMENT

Figure 1:
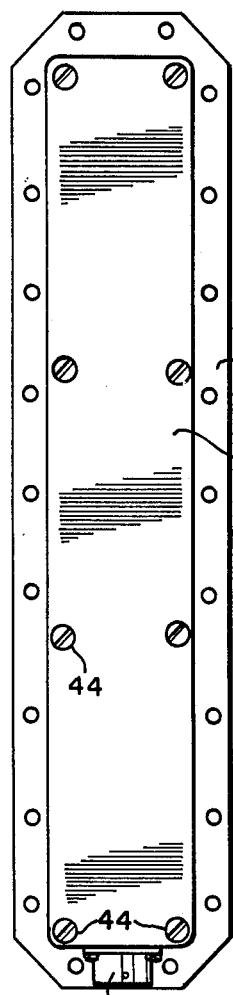
FIG. 1 is a rear view of one housing for the sensing system.
Figure 3:
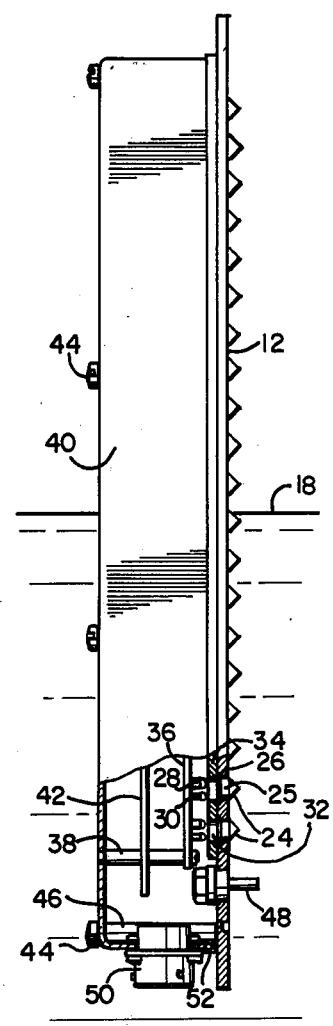
FIG. 3 is a side view of the housing shown in FIG. 1 showing an optical embodiment of the subject invention.
Figure 2:
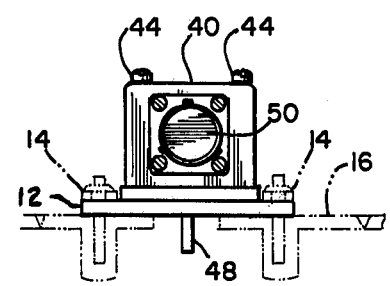
FIG. 2 is a bottom view of the housing shown in FIG. 1.
Figure 4:
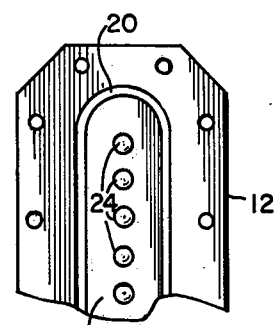
FIG. 4 is a partial front view of the housing shown in FIG. 3.

Referring now to FIGS. 1, 2, 3, 4, and 5 we see the overall structure and organization of one embodiment of the subject invention 10. As shown in FIG. 2 it comprises a base plate 12 which, as shown, is attached with a plurality of bolts 14 to a vertical weldment 16 in the side of the sump or similar container (not shown) being monitored. In use weldment 16 is placed so that the lower end of the face plate is below that surface level of the fluid which, when reached, creates a critical situation insofar as continued safe operation of the system is concerned. Leakage of the fluid 18 being tracked is prevented by an "O" ring or similar sealing method. Where "O" rings are used, face plate 12 has a groove 20 milled into it to receive it and hold it in place. Also, drilled into face plate 12 is a linear regularly spaced array of mounting holes for prism assemblies 24. Inset into each of these is a flanged conical 45° plastic or glass prism which is ground onto the end of a cylinder 25. Various methods of attaching these assemblies can be used but the preferred method is to cement the flange 26 in place with a suitable high temperature inert material such as a ceramic paste or silicone glue. Both of those are readily available at low cost. As used, the cylinders 25 are 10–12 mm in diameter but, depending on the application and its criticality larger or smaller ones can be used. Mounted behind each cylinder is a light source 28, which in the preferred embodiment is a P-N gallium arsenide light emitting diode (LED) and a light detector 30, which in the preferred embodiment is a P-N-P planar silicon phototransistor (PT). Both of these can be obtained in very small sizes, which greatly facilitates their use in this application since they can easily be mounted in close proximity to the rear face. These are inserted through holes 32 in backup plate 34 attached to the rear surface of plate 12. This acts to shield the detector from light coming from the LED's located behind the assemblies immediately above or below it. Furthermore, the LED chosen (such as types TIL 23 or 24) has only a ±15 cone of emitted light so there is essentially no lateral scatter and only a narrow angle of reflected light off the back on the cylinder. As a result, only that light reflected internally by the prism can reach detector 30 to produce a signal. This situation is further enhanced by the fact that the detector (typically types IN 5722 to 25) primarily responds only to light coming essentially directly into it so that the possibility of a false signal being caused by light reflected at an angle is essentially nil.

All of emitters 28 and detectors 30 are located on mounting board 36 which is held in place by a plurality of standoffs 38 attached to the inner surface of metallic housing 40. Also held in place by standoffs 38 is printed circuit board 42 which holds the analog and digital logic providing the outputs. Housing 40 is itself attached to face plate 12 by a plurality of bolts 44 which screw into mating screw mounts 46 attached to face plate 12. Completing the basic assembly is resistance temperature detector (RTD) 48, the purpose of which will be explained below and electric receptical 50 through which the necessary voltages are brought into the system and the output signals transmitted out to the cockpit. Lastly, housing 40 is itself sealed against fumes and corrosive vapors by a rubber or neoprene gasket 52 which fits around its mating edge.

Figure 6:
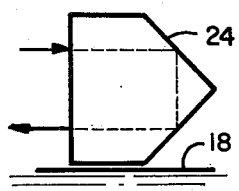
FIGS. 6 and 6A illustrate the effect of a prism detector being completely above the fluid being monitored and the view at the prism end.
Figure 7:
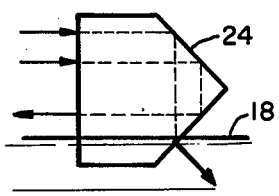
FIGS. 7 and 7A illustrate the effect of a prism being partially submerged and the view at the prism end.
Figure 8:
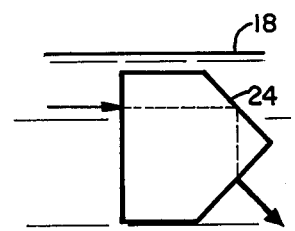
FIGS. 8 and 8A illustrate the effect of a prism being totally submerged and the view at the prism end.
Figure 6A:
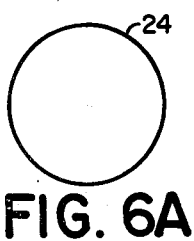
Figure 7A:
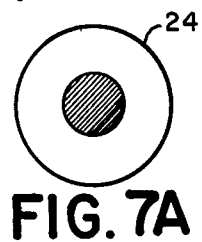
Figure 8A:
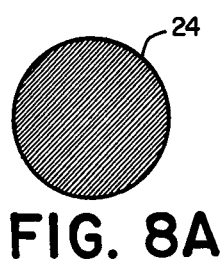
Figure 5:
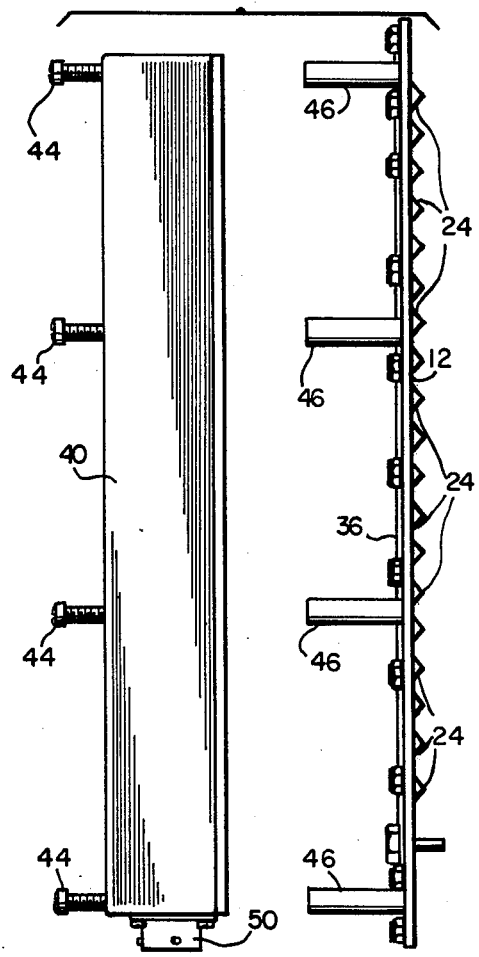
FIG. 5 is a view of the housing showing how it is disassembled.

As noted above the basic principle upon which this invention operates is that of the conversion of signals generated by changes in the index of refraction caused by the presence or absence of fluid in front of one of prisms 24 to a computed level or volume of fluid. To accomplish this in practice the glass or plastic material (preferably a borosilicate glass) chosen for the prisms must have an index of refraction such that when light strikes the surface of the prism at an angle of 45° or greater it will be reflected, internally, back into the interior of the prism at the point of contact. Thus, when the prism is entirely out of the fluid, the light will reflect from one side of the prism to the other at which point essentially all of it is reflected back up the prism and into detector 30. Such a situation is shown in FIGS. 6 and 6A which shows the ideal path light will follow in this situation and the appearance of the back end of prism 24. As shown, the end is bright across its entire diameter. However, when the fluid level rises to a point where the prism is partially submerged only a portion of the light is internally reflected back out, the rest, as shown in FIG. 7, is refracted out of the prism with the result that the area of brightness deminishes in size with a dark ring surrounding it. Such a situation is shown in FIG. 7A. Lastly, when the prism is more or less completely submerged all of the light is refracted out of the prism, essentially none is internally reflected and the back end becomes dark. This situation is shown in FIGS. 8 and 8A.

Figure 9:
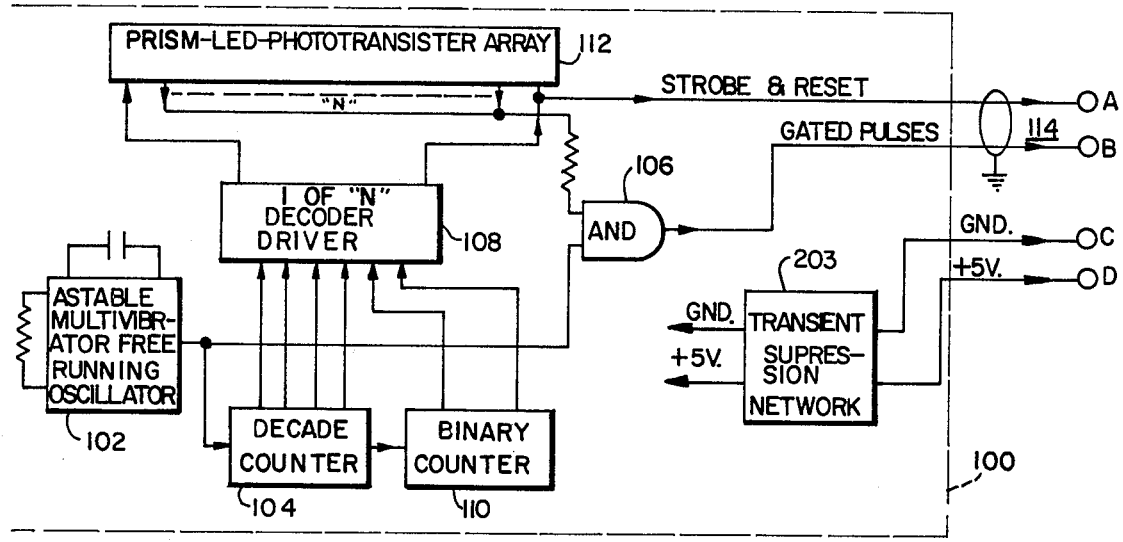
FIG. 9 is a block diagram of the light activation and transmission subsystem of the subject invention.
Figure 10:
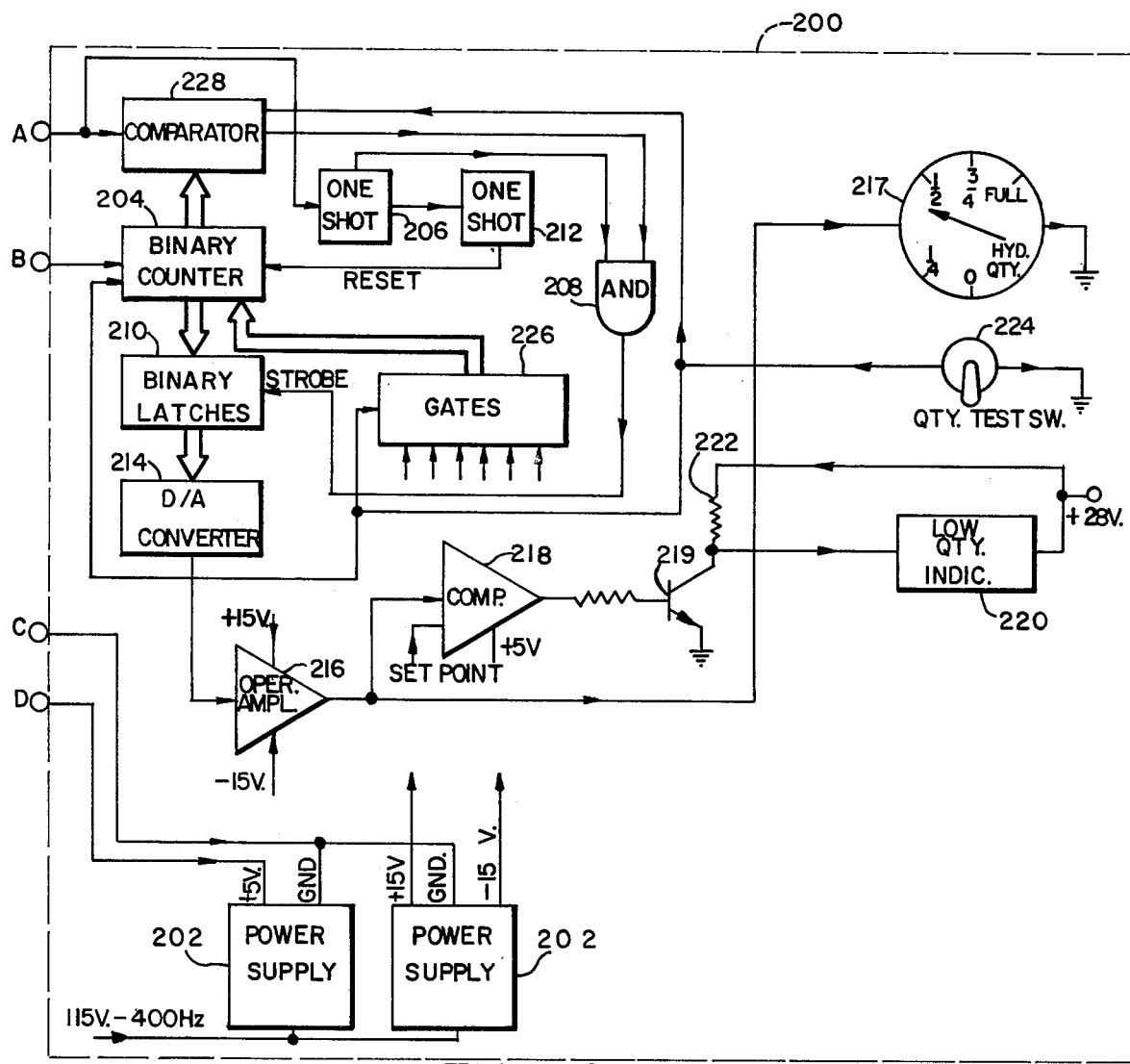
FIG. 10 is a block diagram of the detector, compensation and alert logic of the subject invention.

The basic description give above would be typical for any prism type sensor. These characteristics, however, provide the point from which the subject invention departs from the prior art. Here, instead of just one sensor providing the desired information, all of them are used to provide a dynamic readout which need not be viewed directly, but rather, integrated into a single numerical value which can be transmitted and read remotely. A method for this is shown in FIGS. 9 and 10. FIG. 9 is a block diagram of light activation and transmitter circuit 100. FIG. 10 is a block diagram of the data processing and readout circuitry of monitor 200 which shares certain items in common with illumination circuit 100. Thus, all power to the system starts with the 110 V–400 HZ power supply normally available, for example, in a helicopter system, one of the preferred embodiments. To be of use here this must be converted to the +5 and ±15 V DC voltages required for most integrated circuits. Also, any transient excursions present must be suppressed. This is done in suppression network 203. In addition, the system as configured for the preferred embodiment also will require a +28 V DC power input. This, too, is readily available in most aircraft electrical systems.

Looking in detail now, at FIG. 9 we see the basic signal generation and transmission system 100. Located inside the transmitter, the astable multivibrator 102 generates rectangular shaped clock pulse for multiplexing the detector at a frequency selected in such a way that the scan rate is approximately one per second. These clock pulses are fed to both the decade counter 104 and the AND gate 106.

The BCD output of decade counter 104 addresses the 1 of N decoder-driver 108 (where N is the number of prisms in the assembly) which produces a unique on-state input for each of the 10 states of counter 104. Binary counter 110 is a 2-bit counter (4 states) which then allows for the recycling of counter 104 four times before reset to give maximum expandable unique output of driver 108 of 40. Any given on-state output of driver 108 activates the corresponding LED 28 in the fluid level sensing prism—LED—PT array 112 for a duration of time equal to the width of one clock pulse. If the fluid level is below the refractive region of a given prism, the associated photo transistor turns on producing a pulse of sufficient magnitude and width to act as an input to AND gate 106. Since the clock pulse is still present it acts as the second input to gate 106 to produce output, a gated "Hi" pulse. Conversely, if the fluid level is at or above the prism refractive region, the photo transistor does not turn on and no gated output pulse, or "Lo" appears as an output. Therefore, in one complete scan from top to bottom of the reservoir, each prism is individually interrogated and the number of gated "Hi" pulses is a linear function of the fluid level height. In addition, at the end of each scan, one clock pulse is derived from the last decoded output of driver 108 and is used in the monitor unit to reset it (S & R) for further signal processing. The gated output pulses GP and S & R are transmitted over a shielded pair of wires (114) to the monitor unit 200, shown in FIG. 10.

When received, the gated pulses are serially counted and stored in the binary counter 204 and at the end of a scan, the S & R pulse triggers the one-shot 206. After a nominal delay of one millisecond, the output of one-shot 206 through AND gate 208 strobes the binary latches 210 which transfers the 4-bit binary content of counter 204 to latch 210. The output of one-shot 206 also triggers second one-shot 212 which after a nominal one millisecond delay, resets the binary counter 204 to zero.

Figure 11:
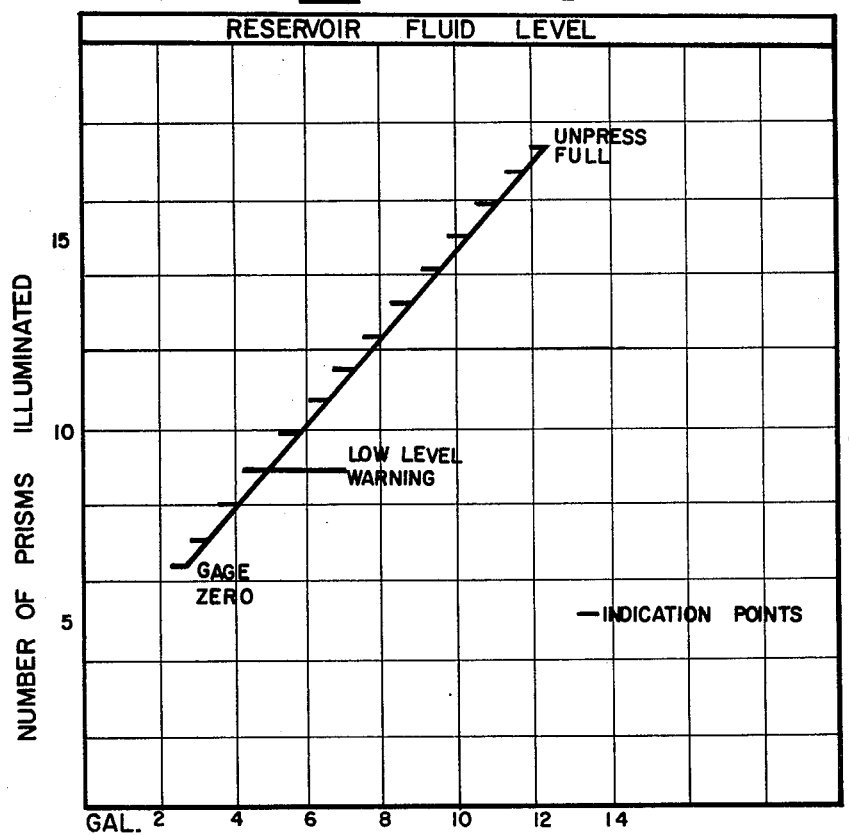
FIG. 11 is a graph showing the response of a unit having 18 prisms.
Figure 12:
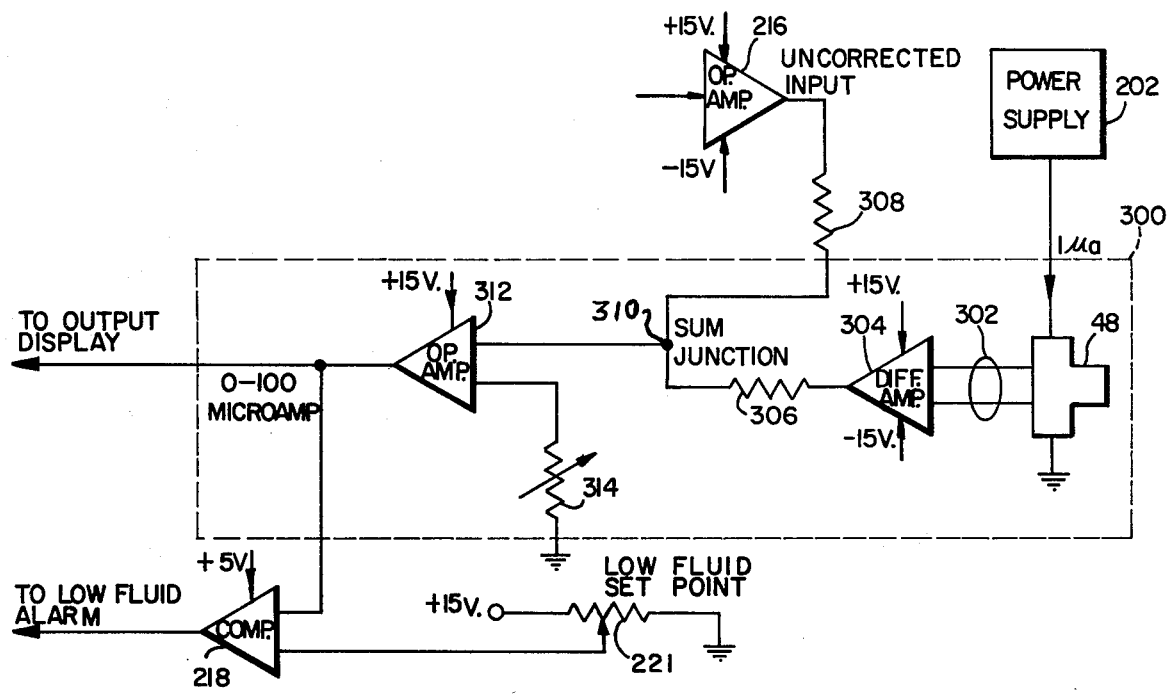
FIG. 12 is a block diagram showing a temperature compensation circuit for the subject invention.

The steady-state 4-bit binary output of latch 210 addresses the D/A converter 214 which produces an analog output voltage proportional to its binary input. This analog output feeds inverting operational amplifier 216 which performs the function of scaling the output signal to span the nominal range of 0-1 milliampere for readout and display on the remote indicator 217 on the flight deck instrument panel. FIG. 11 shows a typical response curve from an 18 prism system. This output also supplies one input to the bistable comparator 218. The second input to comparator 218 is a set point analog voltage derived from a precision voltage divider 221 which is returned to the +15 volt DC supply 202. The fluid level at which a low level indication is given may be varied by adjusting the voltage divider 221, as shown in FIG. 12. The magnitude of the set point voltage corresponds to the output voltage of amplifier 216 when the hydraulic fluid level reaches the low level limit. At this limit, comparator 218 will change state and provide an output voltage to supply base current for transistor 219. The saturation of transistor 219 turns on a low quantity indicator lamp 220 on the flight deck instrument panel. This lamp will remain on as long as the fluid level is at or below the specified low quantity set point. The low quantity set point may be varied by varying the voltage reference applied to the set point input of comparator 218. If, for any reason, the indicator lamp should burn out, the presence of the collector pull-up resistor 22 insures that the signal delivered to the flight deck low quantity indicator is either +28 or a few tenths of a volt; a bistable condition readily discernable by a portable voltmeter for trouble shooting purposes. The origin of the low quantity test command signal is the monitoring switch 224 in the flight deck instrument panel. Depressing and holding this switch sinks gate currents from gates 226. The second input to these gates is a binary encoded signal corresponding to the equivalent low quantity limit. The binary outputs of the gates are parallel loaded into the binary counter 204 which have priority over any serial input present or in progress from transmitter 100. A subsequent S & R pulse from the transmitter will transfer this binary value to latch 210 which in turn addresses the D/A converter 214 to produce the properly scaled analog output voltage from amplifier 216 as previously described.

In the design of the preferred embodiment, the dynamic performance of a measuring channel is an important consideration. Three important factors in the design are:
 1. Required response time of the system.
 2. Immunity to noise.
 3. Desired response under failure conditions (reservoir leak or rupture).

Since the transmitter is essentially a digital transducer and the recording electronic output is also digital, a discussion is given here of means for accommodating these three factors within the scope of the preferred design.

The general approach is to choose a clock frequency which meets the required response time of the system and to provide a "reasonability" check in the monitor unit electronics on successive signals received from the transmitter. If the clock frequency is too low the system will not meet the required response time and if the clock frequency is too high the transmitter will produce valid signal codes in response to transient fluid level conditions, i.e. sloshing. The clock frequency is variable over a considerable range by changing the values of the resistor and capacitor components of oscillator 102. Techniques for doing this are well known and easily applied. Stability is assured by the choice of these passive components. The logic comparator block 228 shown in the receiver section of the monitor unit provides for the "reasonability" check of messages from the transmitter. The comparator unit senses the number of counts recorded by the binary counter 204 and generates a binary signal for comparison with the next sample extracted from counter 204. This sample occurs after the next complete prism scan. If this new sample differs by more than ±1 count from the previous sample, the strobe signal to latch 210 is inhibited via gate 208 so that the previous binary count continues to address the D/A converter 214 producing the same analog output voltage. Therefore, an upper and lower limit has been placed on the rate at which the input signal can change and be acceptable.

The output signals produced can be used as the basis for a displayed level value. However, experience has shown that, under certain circumstances, if this is done serious errors can be introduced into the value displayed. This is because in use, the fluid heats up and tends to expand. Thus, the indicated fluid level may be higher than the real one. As long as there is an excess of fluid in the system this creates no problem. But, as the fluid is consumed, a value is reached below which the engine may not operate properly, and an errant high reading may produce serious consequences, up to and including catastrophic failure. Thus, it is important that the signal be corrected for fluid expansion to produce a more accurate value for the true fluid level. The means for doing this is shown in detail in FIG. 12, which is a block diagram of compensation circuit 300. The start of this correction is with RTD 48 which is always immersed in the fluid. This is energized with a constant 1 ma input which is added to power supply 202. This current level is to give freedom from error caused by temperatures associated with cable length resistance changes and simplicity of linear voltage development as a function of temperature. Since the current is held constant the voltage measured across RTD 48 is the only one of interest in this circuit and will remain constant no matter what the other circuit elements are doing. The RTD used is selected so that the voltage output developed is a linear function of temperature. Freedom from noise and stray pickup is further assured by feeding the RTD output voltage leads 302 into ground isolating differential amplifier 304. The outputs of amplifiers 304 and 216 after going through voltage adjustment resistors 306 and 308, respectively, are jointly fed as input into summing junction 310 the input to scaling amplifier 312. Scaling is done with variable resistor 314 which adjusts the final gain of the amplifier. This is usually set to produce a maximum output of 100 microamps.

The output of amplifier 312 can be divided into two parts. The first of these as noted above goes directly to output meter 217. This can be either analog or digital depending on individual needs and preferences.

The second of these is fed as one input to bistable comparator 218. The other comparator input is inserted with the low fluid level set point 221 to comparator 218. By so doing, a true low quantity signal independent of fluid temperature can be produced.

The signal display means 217 shown in FIG. 10 is an analog meter. However, the signal output signal could also be displayed digitally as well. When this is done, suitable logic can also be inserted into the system to correct the signal level for the nonuniform cross sections found in many sump and container configurations.

Figure 15:
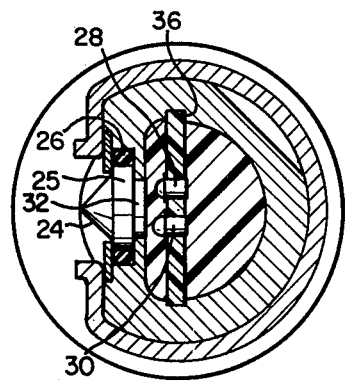
FIG. 15 is a cross section of the alternative arrangement in FIG. 13 along line 15—15 in FIG. 14 showing the arrangement of the prism, light source, and photodetector.

Another embodiment of the present invention is shown in FIGS. 13, 14, and 15. This shows a self-contained "dip stick" arrangement which can be screwed onto and into a container such as a radiator or sump which is normally filled from the top. This offers the advantage of a relatively easy retrofit into many existing aircraft without substantial modification of the structure. The only major modification for a top mounted unit is that the low level and temperature monitors be at the outer end.

Although the present invention has been described with reference to the particular embodiments set forth herein, it is to be understood that the present disclosure has been made only by way of example and that numerous changes in the details of construction may be resorted to without departing from the spirit and scope of the invention. Thus, the scope of the invention should not be limited by the foregoing specifications but rather only by the scope of the claims appended hereto.

What is claimed is:

1. An apparatus for monitoring the level of fluid in a container which comprises:
    an array of sensors, each of said sensors being adapted to provide a signal to indicate if said sensor is immersed in the fluid, said array being positioned in the container so that said array is substantially immersed in the fluid when the container is full, said array being aligned and adapted in a manner so that said signals may substantially indicate the fluid level within the container;
    a processor means adapted to receive said signals and present them in a form more suitable for use;
    a plurality of transparent conical prisms located so that the apex of each prism protrudes into the interior of said container;
    a set of light sources fitted one behind each of said prisms and adapted to direct a beam of light into the base of said prism such that if the prism is below the surface of the contained fluid the beam will be refracted out of said prism and be lost but if the prism is not submerged, the light beam will be internally reflected back out of the base of said prism into the interior of said container;
    a set of detectors fitted one behind the base of each prism adapted to receive said reflected beam when it is present and emit an electric signal which will indicate such reception;
    a multiplex circuit adapted to energize in sequence each of said light sources while simultaneously testing each of said detectors to determine if it is emitting a signal indicative of a reflected light beam;
    a counting circuit means adapted to count the number of detectors indicating reflected light and emit an electrical signal which is proportional to said number, said signal representing the height of the fluid in the container; and
    a temperature compensation means adapted to develop a voltage representative of any errors in fluid level introduced by temperature changes in both the fluid and system components, and a summing junction wherein said proportional signal is summed with said error signal to produce a corrected electrical signal representing the true height of the fluid in the container being monitored.

2. The apparatus of claim 1 wherein the cone base angle of said conical prism is nominally 45 degrees.

3. The apparatus of claim 2 wherein said control prism is made of borosilicate glass.

4. The apparatus of claim 1 wherein said counting circuit means further comprises low level sensing means adapted to detect when the level of fluid in said container falls below a preset level.

5. The apparatus of claim 4 which further includes an alarm means adapted to signal when the fluid level falls below said preset level.

6. The apparatus of claim 4 wherein said counting means further comprises display means adapted to indicate the level of fluid remaining in the container in which said array of sensors is positioned.

7. An apparatus for monitoring the level of fluid in a container, such as an oil sump in a helicopter engine and similar means, comprising:

sensing means adapted to be inserted into said fluid through a set of more or less regularly spaced sealed openings along the length of said housing such that at least one of said openings is above the nominal level of the contained fluid, and at least one other opening is below said nominal level, said means comprising a plurality of transparent borosilicate nominally 45° conical prisms having their bases located and sealed into said openings so that the apex of each prism protrudes into the interior of the container, a set of light sources fitted one behind each of said prisms and adapted to direct a beam of light into the base of said prism, such that if the prism is below the surface of the contained fluid the beam will be refracted out of said prism and be lost, but if the prism is not submerged the light beam will be internally reflected back out of the base of said prism into the interior of said housing and a set of detectors fitted one behind the base of each prism adapted to receive said reflected beam when it is present and emit an electric signal which will indicate such reception, multiplex ciruit means adapted to energize in sequence each of said light sources while simultaneously testing each of said detectors to determine if it is emitting a signal indicative of a reflected light beam, counting circuit means adapted to count the number of detectors indicating a reflected light and emit a signal which is proportional to said number, said signal representing the height of the fluid in the container and low level sensing means adapted to detect when the level of fluid in said container falls below a preset level;

conversion means adapted to receive said proportional signal and change it into a form suitable for display and analysis, further comprising display means adapted to indicate the level of fluid remaining in the container to which said electrosensor is attached; and compensation means adapted to monitor the temperature of the contained fluid comprising a temperature measurement means adapted to develop a voltage representative of the errors introduced by temperature changes in both the fluid and system components and a summing junction wherein said proportional signal is summed with said error signal to produce a corrected electrical signal representing the true height of fluid in the container being monitored.

* * * * *

UNITED STATES PATENT AND TRADEMARK OFFICE
CERTIFICATE OF CORRECTION

PATENT NO. : 4,286,464
DATED : September 1, 1981
INVENTOR(S) : Thomas E. Tauber et al.

It is certified that error appears in the above—identified patent and that said Letters Patent is hereby corrected as shown below:

Column 8, Claim 3, line 58, "control" should read -- conical --

Signed and Sealed this

Tenth Day of November 1981

[SEAL]

Attest:

GERALD J. MOSSINGHOFF

Attesting Officer    Commissioner of Patents and Trademarks